(12) United States Patent
Shimanaka (10) Patent No.: US 8,512,201 B2
(45) Date of Patent: Aug. 20, 2013

(54) CONTROL APPARATUS FOR HYBRID VEHICLE

(75) Inventor: Shigeki Shimanaka, Hasano (JP)

(73) Assignee: Jatco Ltd, Fuji-shi (JP)

( * ) Notice: Subject to any disclaimer, the term of this patent is extended or adjusted under 35 U.S.C. 154(b) by 578 days.

(21) Appl. No.: 12/730,693

(22) Filed: Mar. 24, 2010

(65) Prior Publication Data
US 2010/0248893 A1 Sep. 30, 2010

(30) Foreign Application Priority Data
Mar. 30, 2009 (JP) ................................. 2009-081164

(51) Int. Cl.
*B60W 10/02* (2006.01)
*F16H 59/00* (2006.01)

(52) U.S. Cl.
USPC ................................................. 477/5; 477/98

(58) Field of Classification Search
USPC ................. 477/3, 5, 98; 180/65.245, 65.265, 180/65.275, 65.28
See application file for complete search history.

(56) References Cited

U.S. PATENT DOCUMENTS

| 7,360,616 B2 | 4/2008 | Schiele | |
|---|---|---|---|
| 7,686,112 B2 | 3/2010 | Shiiba | |
| 7,708,095 B2 | 5/2010 | Hirata | |
| 2005/0155803 A1 | 7/2005 | Schiele | |
| 2007/0080005 A1* | 4/2007 | Joe | 180/65.2 |
| 2007/0272456 A1 | 11/2007 | Shiiba | |
| 2007/0275819 A1 | 11/2007 | Hirata | |
| 2009/0143189 A1* | 6/2009 | Hasegawa et al. | 477/5 |

FOREIGN PATENT DOCUMENTS

| EP | 1 862 364 A1 | 12/2007 |
|---|---|---|
| EP | 1 939 059 A2 | 7/2008 |
| JP | 2005-221073 A | 8/2005 |
| JP | 2006-205900 A | 8/2006 |
| JP | 2007-314097 A | 12/2007 |
| JP | 2008-007094 A | 1/2008 |

* cited by examiner

*Primary Examiner* — Roger Pang
(74) *Attorney, Agent, or Firm* — Foley & Lardner LLP (57) ABSTRACT

A control apparatus of hybrid vehicle has a drive mode change section, a temperature detection section detecting a second engagement element temperature, and a second engagement element protection control section. The drive mode change section changes drive modes of a first drive mode in which the first engagement element is disengaged and the second engagement element is engaged then the vehicle travels by only a driving force of the motor, a second drive mode in which the first and second engagement elements are respectively engaged then the vehicle travels by both driving forces of the engine and motor, and a third drive mode in which the second engagement element is slip-engaged then the vehicle travels by a driving force transmitted through the second engagement element. The second engagement element protection control section keeps an engine rotating state regardless of the drive mode when the second engagement element temperature is high.

8 Claims, 8 Drawing Sheets

ACCELERATOR OPENING

FIG.9B

REVOLUTION SPEED

FIG.9C

MODE CHANGE OF COMPARATIVE EXAMPLE

FIG.9D

MODE CHANGE OF EMBODIMENT 1-1

FIG.9E

MODE CHANGE OF EMBODIMENT 1-2

ACCELERATOR OPENING OF FAST RATE OF CHANGE

FIG.12B

MODE CHANGE OF [RATE OF CHANGE > C]

FIG.12C

ACCELERATOR OPENING OF SLOW RATE OF CHANGE

FIG.12D

MODE CHANGE OF [RATE OF CHANGE ≤ C]

CONTROL APPARATUS FOR HYBRID VEHICLE

BACKGROUND OF THE INVENTION

The present invention relates to a control apparatus for a hybrid vehicle which has a plurality of drive modes and changes the drive mode according to predetermined conditions.

In recent years, there have been proposed and developed various control apparatuses for the hybrid vehicle in which a first engagement element to connect/disconnect an engine and a motor and a second engagement element to connect/disconnect the motor and driving wheels are provided. The hybrid vehicle has, as drive modes, a motor-use drive mode (hereinafter called "EV drive mode") in which the vehicle travels with only the motor being a power source and an engine-use drive mode (hereinafter called "HEV drive mode") in which the vehicle travels with the engine included as the power source. In such control apparatuses, for example, Japanese Patent Provisional Publication No. 2005-221073 (hereinafter is referred to as "JP2005-221073") discloses a control apparatus of the hybrid vehicle which increases gas mileage by changing the drive mode in accordance with a vehicle condition and a traveling condition.

In such hybrid vehicles, since there is no element such as a torque converter which serves to absorb input rotation speed and change of the rotation speed, when the vehicle starts with the first and second engagement elements completely engaged, a vehicle speed is determined according to an engine rotation speed. On the other hand, regarding the engine, there is a lower limit value of an idle rotation speed for maintaining a self-rotation of the engine. Under a condition in which an idle-up control by engine warming-up etc. is being carried out, this lower limit value of the idle rotation speed becomes even higher.

Therefore, at the vehicle start when a required driving force by a driver is high and the vehicle start using the both driving forces of the engine and the motor is required, in order to fulfill a rotation absorption function while meeting the required driving force, by performing a slip-control of the second engagement element, the vehicle travel using the engine becomes possible. This drive mode is called "WSC (Wet Start Clutch) drive mode".

SUMMARY OF THE INVENTION

In the related art control apparatus of the hybrid vehicle, however, normally, the engine is stopped upon the vehicle travel in the EV drive mode. Thus, when the driver's required driving force becomes high by a driver's accelerator pedal depressing operation and a mode change to the HEV drive mode is judged (or determined), because a reserve force (or a reserve torque) must be saved for an engine start, the motor can use only torque except the reserve torque in the EV drive mode. That is, when the driving force that is greater than or equal to a usable driving force in the EV drive mode is required, after starting the engine by the reserve force of the motor, the mode is changed to the HEV drive mode, then it becomes possible to meet the required driving force by both an engine torque and the motor torque. Hence, an area that can maintain the EV drive mode narrows by a magnitude of the reserve force for the engine start.

As explained above, since the reserve force of the torque required for the engine start is needed to be saved, the area of the EV drive mode (the area in which the EV drive mode can be selected) becomes narrower than an area of the EV drive mode determined by the torque which the primary motor is able to output. For this reason, upon the vehicle start, the number of occurrences of a WSC start from the engine start is increased, and the frequency of the slip-control of the second engagement element is also increased with this occurrence.

In particular, at the accelerator pedal depression start where the driver's required driving force is high, the vehicle start is the WSC start from the engine start, and the frequency of the slip-control of the second engagement element increases. Then, under a condition in which the second engagement element is too hot by the slip-control, when the slip-control by the WSC drive mode is further carried out at the next vehicle start, there is a possibility that durability of the second engagement element will decrease.

For this problem, it is therefore an object of the present invention to provide a control apparatus for the hybrid vehicle, which can ensure the durability and reliability of the second engagement element by reducing the frequency of the mode change to a third drive mode (the WSC drive mode) that leads to the overheating (heat generation) of the second engagement element upon the vehicle start.

According to one aspect of the present invention, a control apparatus of a hybrid vehicle, the hybrid vehicle has an engine, a motor, a first engagement element arranged between the engine and the motor for connecting/disconnecting the engine and the motor and a second engagement element arranged between the motor and driving wheels for connecting/disconnecting the motor and the driving wheels, the control apparatus comprises: a drive mode change section that changes the following drive modes according to a vehicle travel state: a first drive mode in which the first engagement element is disengaged and the second engagement element is engaged then the vehicle travels by only a driving force of the motor, a second drive mode in which the first and second engagement elements are respectively engaged then the vehicle travels by both driving forces of the engine and the motor, and a third drive mode in which the second engagement element is slip-engaged then the vehicle travels by a driving force transmitted through the second engagement element; a temperature detection section that detects a temperature of the second engagement element; and a second engagement element protection control section that keeps an engine rotating state regardless of the drive mode when the temperature of the second engagement element is a predetermined temperature or higher.

According to another aspect of the invention, a method for controlling a hybrid vehicle, the hybrid vehicle which is provided with a first engagement element arranged between an engine and a motor for connecting/disconnecting the engine and the motor and a second engagement element arranged between the motor and driving wheels for connecting/disconnecting the motor and the driving wheels, and has the following drive modes: a first drive mode in which the first engagement element is disengaged and the second engagement element is engaged then the vehicle travels by only a driving force of the motor, a second drive mode in which the first and second engagement elements are respectively engaged then the vehicle travels by both driving forces of the engine and the motor, and a third drive mode in which the second engagement element is slip-engaged then the vehicle travels by a driving force transmitted through the second engagement element, the method comprises: changing the drive mode according to a vehicle travel state; detecting a temperature of the second engagement element, and keeping an engine rotating state regardless of the drive mode when the temperature of the second engagement element is a predetermined temperature or higher.

The other objects and features of this invention will become understood from the following description with reference to the accompanying drawings.

DETAILED DESCRIPTION OF THE INVENTION

According to a control apparatus of a hybrid vehicle of the present invention, when a temperature of a second engagement element is a predetermined temperature or higher, by a second engagement element protection control section, since an engine operating (rotating) state is kept regardless of a drive mode, a reserve force of a motor torque, which is saved for an engine start, can be fully used for a driving torque in an first drive mode in which the vehicle travels by only a driving force of a motor.

In other words, while meeting driver's required driving force, a drive area (an area condition) in which the first drive mode is selected can be extended. With this expansion of the first drive mode selection area, the frequency of a vehicle start by the first drive mode is increased, while the frequency of a vehicle start that is performed after changing the drive mode to a third drive mode from the engine start is decreased without giving an awkward feeling caused by lack of the driving force to the driver.

As a result, the frequency of the mode change to the third drive mode, which causes the overhearing of the second engagement element, can be reduced at the vehicle start, then the durability and reliability of the second engagement element can be ensured.

Embodiments of the present invention will now be explained below with reference to the drawings.

[Embodiment 1]

Figure 1:
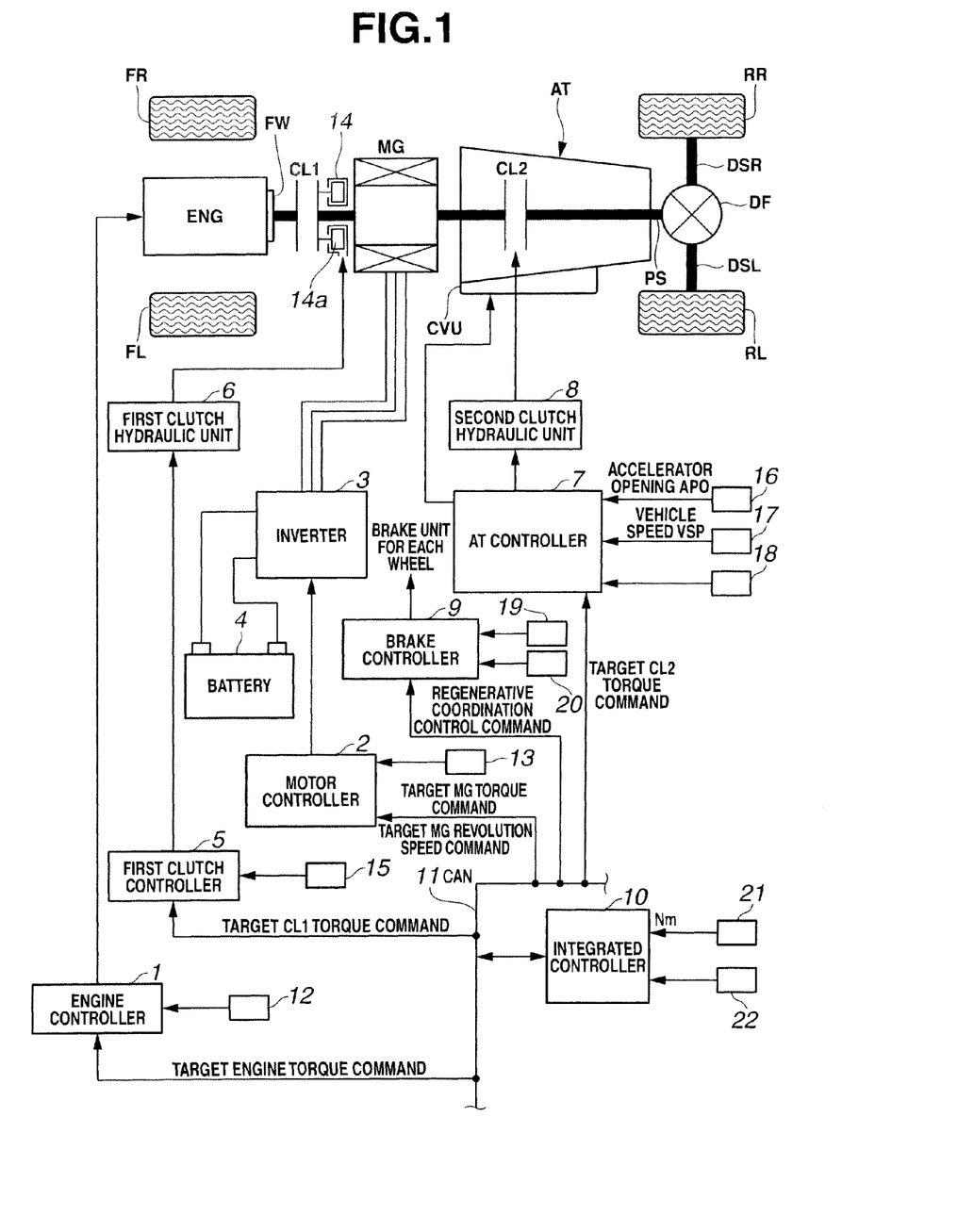
FIG. 1 is a system block diagram showing a rear-wheel-drive FR hybrid vehicle (an example of the hybrid vehicle) employing a control apparatus of an embodiment 1.

First, the whole system of the present invention will be explained. FIG. 1 is a system block diagram showing a rear-wheel-drive FR hybrid vehicle (an example of the hybrid vehicle) employing a control apparatus of an embodiment 1.

As can be seen in FIG. 1, a driveline of the FR hybrid vehicle in the embodiment 1 has an engine Eng, a flywheel FW, a first clutch CL1 (a first engagement element), a motor/generator MG (a motor), a second clutch CL2 (a second engagement element), an automatic transmission AT, a propeller shaft PS, a differential gear DF, a left drive shaft DSL, a right drive shaft DSR, a rear-left wheel (driving wheel) RL, and a rear-right wheel (driving wheel) RR. FL is a front-left wheel, FR is a front-right wheel.

The engine Eng is a gasoline engine or a diesel engine, and the flywheel FW is provided on an engine output shaft. On the basis of an engine control command from an engine controller 1, an engine start control, an engine stop control, a valve opening control of a throttle valve and a fuel cut control etc. are carried out.

The first clutch CL1 is arranged between the engine Eng and the motor/generator MG. Engagement/slip-engagement (half clutch or partial clutch engagement)/disengagement, of the first clutch CL1, are controlled by a first clutch control pressure that is produced by a first clutch hydraulic unit 6 on the basis of a first clutch control command from a first clutch controller 5. As the first clutch CL1, for example, a normally-closed dry single disc clutch is used. The normally-closed dry single disc clutch is urged by a diaphragm spring and its complete engagement is held by this spring force. Further, clutch control from the slip-engagement to complete disengagement is carried out by a stroke control using a hydraulic actuator 14 having a piston 14a.

The motor/generator MG is a synchronous motor/generator in which a permanent magnet is embedded in a rotor and a stator coil is wound around a stator. On the basis of a control command from a motor controller 2, the motor/generator MG is controlled through the application of a three-phase alternating current that is generated by an inverter 3. This motor/generator MG works as an electric motor that performs a rotational drive operation by receiving a power from a battery 4 (hereinafter, this state is called a power running state). And also, in a case where the rotor is rotated by receiving a rotational energy from the engine Eng or the driving wheels, the motor/generator MG works as a generator that generates an electromotive force at both ends of the stator coil, and is able to charge the battery 4 (hereinafter, this operating state is called a regenerative state). The rotor of this motor/generator MG is connected to a transmission input shaft of the automatic transmission AT through a damper (not shown).

The second clutch CL2 is arranged between the motor/generator MG and the rear left and right wheels RL, RR. Engagement/slip-engagement/disengagement, of the second clutch CL2, are controlled by a control pressure that is produced by a second clutch hydraulic unit 8 on the basis of a second clutch control command from an AT controller 7. As the second clutch CL2, for example, a normally-open wet multiple disc clutch or wet multiple disc brake, which is capable of continuously controlling an oil flow amount and the oil pressure through a proportional solenoid, is used. Here, the first clutch hydraulic unit 6 and the second clutch hydraulic unit 8 are built into an AT hydraulic control valve unit CVU that is provided in the automatic transmission AT.

The automatic transmission AT is a multi-range transmission that automatically changes a shift position of multispeed (multistage) of, for example, forward 7 speeds and reverse 1 speed according to a vehicle speed and an accelerator opening and so on. An output shaft of the automatic transmission AT is connected to the rear left and right wheels RL, RR through the propeller shaft PS, the differential gear DF, the left drive shaft DSL and the right drive shaft DSR. Here, the above second clutch CL2 is not a clutch that is newly added as a special clutch, but an optimum clutch or brake arranged on a torque transmission path of the driveline, among a plurality of frictional engagement elements which are engaged in each speed or each shift stage in the automatic transmission AT, is selected as the second clutch CL2.

The driveline in the hybrid vehicle in the embodiment 1 has drive modes such as an electric vehicle drive mode (hereinafter called EV drive mode), a hybrid vehicle drive mode (hereinafter called HEV drive mode) and a driving torque control drive mode (hereinafter called WSC drive mode).

The EV drive mode (a first drive mode) is a mode in which the first clutch CL1 is disengaged and the vehicle travels by only a driving force of the motor/generator MG.

The HEV drive mode (a second drive mode) is a mode in which the vehicle travels with the first clutch CL1 engaged, and has a motor assist drive mode, a drive electric power generation mode and an engine drive mode. The motor assist drive mode is a mode in which the vehicle travels by the driving force of the engine Eng and the motor/generator MG. The drive electric power generation mode is a mode in which a part of the driving force of the engine Eng is used for the power generation of the motor/generator MG and the vehicle travels with the remainder of the driving force being the driving force for the drive. The engine drive mode is a mode in which the vehicle travels by only the driving force of the engine Eng.

The WSC drive mode (a third drive mode) is a mode in which the vehicle starts while maintaining the slip-engagement of the second clutch CL2 by a revolution speed control of the motor/generator MG and controlling a clutch torque capacity so that a clutch transmission torque transmitted through the second clutch CL2 is a required driving torque determined in accordance with a vehicle condition and driver's operation. This WSC drive mode is selected at the vehicle start in the HEV drive mode in which the engine start and the engagement of the first clutch CL1 are completed before the vehicle start, and at the vehicle start of a case where the mode change to the HEV drive mode is judged when the vehicle starts in the EV drive mode in which the first clutch CL1 is held disengaged.

Next, a control system of the hybrid vehicle will be explained.

As shown in FIG. 1, the control system of the FR hybrid vehicle has the engine controller 1, the motor controller 2, the inverter 3, the battery 4, the first clutch controller 5, the first clutch hydraulic unit 6, the AT controller 7, the second clutch hydraulic unit 8, a brake controller 9, and an integrated controller 10. Here, the engine controller 1, the motor controller 2, the first clutch controller 5, the AT controller 7, the brake controller 9 and the integrated controller 10 are connected with each other through a CAN (Controller Area Network) communication line 11 that allows an information exchange between controllers.

The engine controller 1 inputs engine rpm information from an engine rpm sensor 12 and a target engine torque command from the integrated controller 10, also inputs the other information. Then the engine controller 1 outputs a command that controls an engine operating point (Ne, Te) to a throttle valve actuator etc. of the engine Eng.

The motor controller 2 inputs information from a resolver 13 that detects a rotor rotational position of the motor/generator MG, a target MG torque command and a target MG revolution speed command from the integrated controller 10, also inputs the other information. Then the motor controller 2 outputs a command that controls a motor operating point (Nm, Tm) of the motor/generator MG to the inverter 3. In addition, the motor controller 2 measures or checks a battery SOC that indicates a capacity of charge of the battery 4. This battery SOC information is used for the control of the motor/generator MG, and also is sent to the integrated controller 10 through the CAN communication line 11.

The first clutch controller 5 inputs sensor information from a first clutch stroke sensor 15 that detects a stroke position of the piston 14a of the hydraulic actuator 14 and a target CL1 torque command from the integrated controller 10, also inputs the other information. Then the first clutch controller 5 outputs a command that controls the engagement/slip-engagement/disengagement of the first clutch CL1 to the first clutch hydraulic unit 6 in the AT hydraulic control valve unit CVU.

The AT controller 7 inputs information from an accelerator opening sensor 16, a vehicle speed sensor 17 and a second clutch temperature sensor 18 (a temperature detection device or means or section) that detects an ambient temperature of a facing of the second clutch CL2. Then, during the travel with a D-range selected, the AT controller 7 searches an optimum speed range (optimum speed stage) according to a position on a shift map, of the operating point determined by an accelerator opening APO and a vehicle speed VSP, and also outputs a control command that achieves the searched speed range to the AT hydraulic control valve unit CVU. Here, the shift map is a map where an up-shift line and a down-shift line are drawn according to the accelerator opening and the vehicle speed.

In addition to the automatic transmission control, when inputting a target CL2 torque command from the integrated controller 10, the AT controller 7 executes a second clutch control in which a command that controls the slip-engagement of the second clutch CL2 is outputted to the second clutch hydraulic unit 8 in the AT hydraulic control valve unit CVU. Moreover, when a shift control change command is outputted from the integrated controller 10, instead of a normal shift control, the AT controller 7 executes a shift control based on the shift control change command.

The brake controller 9 inputs sensor information from a wheel speed sensor 19 for detecting each wheel speed of four wheels and a brake stroke sensor 20 and a regenerative coordination control command from the integrated controller 10, also inputs the other information. Then, for instance, in a case where the brake is applied by only a regenerative braking force upon a brake operation by brake pedal depression, when the braking force is lacking for a required braking force according to a brake stroke BS of the brake pedal depression, the brake controller 9 performs a regenerative coordination brake control so that the shortage of the braking force is compensated by a mechanical braking force (a hydraulic braking force or a motor braking force).

The integrated controller 10 is a controller that controls a consumption energy of the whole vehicle, and in order for the hybrid vehicle to travel at a maximum efficiency, the integrated controller 10 performs the operation. The integrated controller 10 inputs information from a motor revolution speed sensor 21 for detecting the motor revolution speed Nm and other sensors/switches 22, also inputs the other information through the CAN communication line 11. Then the integrated controller 10 outputs the target engine torque command to the engine controller 1, outputs the target MG torque command and the target MG revolution speed command to the motor controller 2, outputs the target CL1 torque command to the first clutch controller 5, outputs the target CL2 torque command to the AT controller 7, and outputs the regenerative coordination control command to the brake controller 9.

Figure 2:
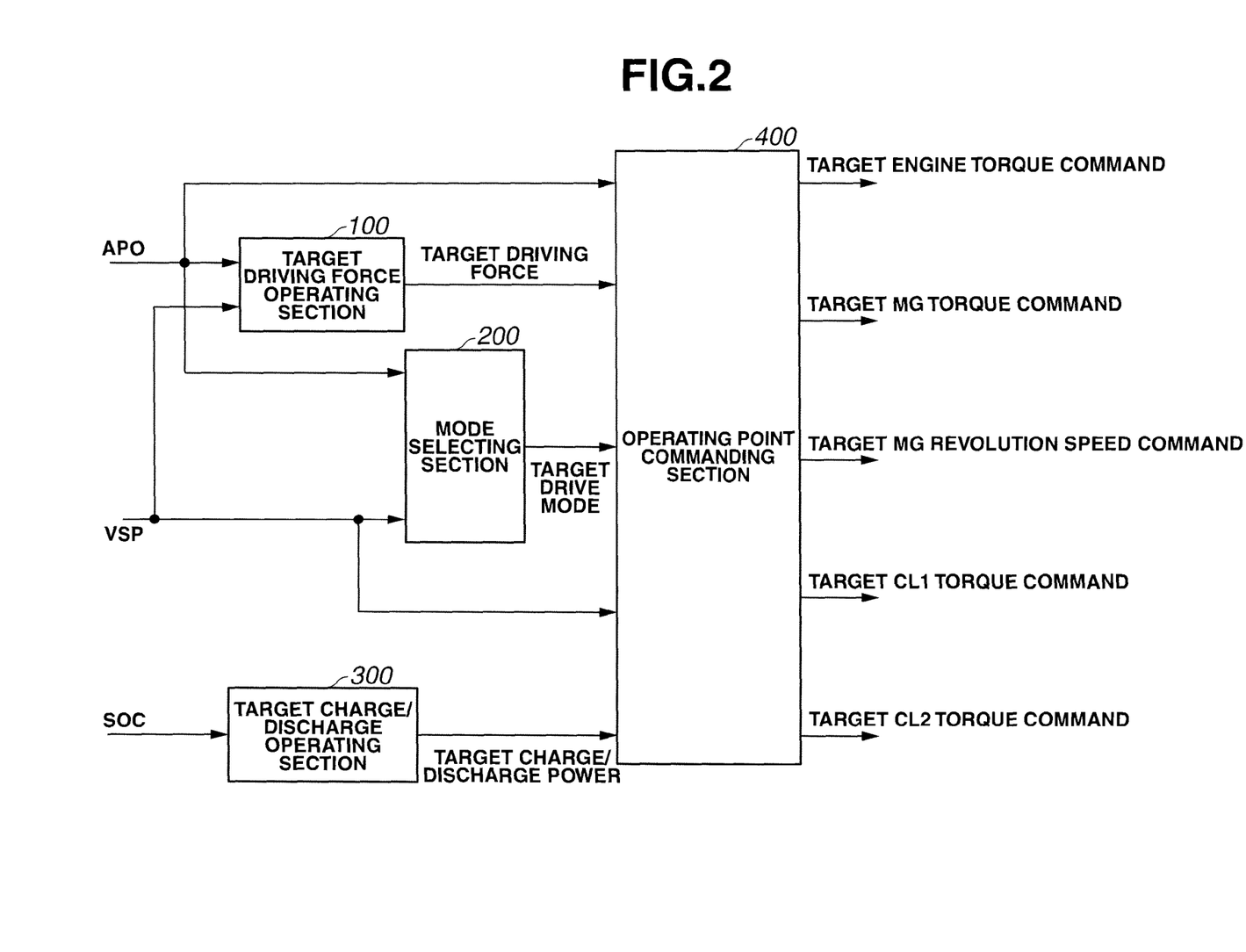
FIG. 2 is a control block diagram showing an operation process executed in an integrated controller 10 in the FR hybrid vehicle employing the control apparatus of the embodiment 1.
Figure 3:
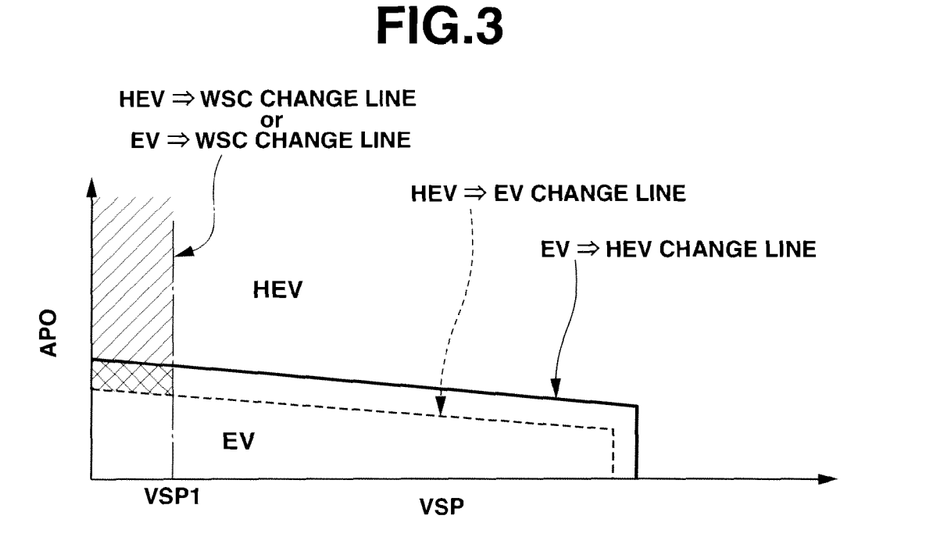
FIG. 3 is an EV-HEV selection map used when performing a mode selection operation in the integrated controller 10 in the FR hybrid vehicle employing the control apparatus of the embodiment 1.
Figure 4:
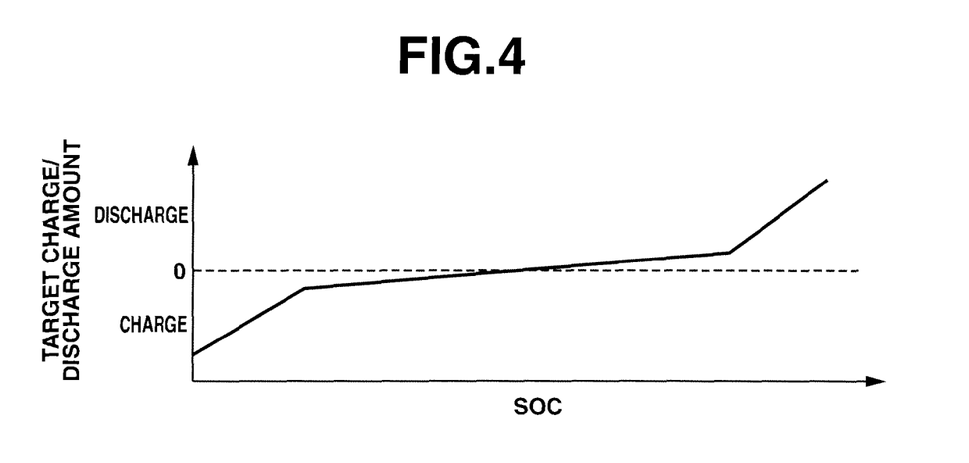
FIG. 4 is a target charge/discharge amount map used when performing a battery charge control in the integrated controller 10 in the FR hybrid vehicle employing the control apparatus of the embodiment 1.

FIG. 2 is a control block diagram showing an operation process executed in the integrated controller 10 in the FR hybrid vehicle employing the control apparatus of the embodiment 1. FIG. 3 is an EV-HEV selection map used when performing a mode selection operation in the integrated controller 10 in the FR hybrid vehicle employing the control apparatus of the embodiment 1. FIG. 4 is a target charge/discharge amount map used when performing a battery charge control in the integrated controller 10 in the FR hybrid vehicle employing the control apparatus of the embodiment 1.

In the following, the operation process executed in the integrated controller 10 will be explained with reference to FIGS. 2 to 4.

As shown in FIG. 2, the integrated controller 10 has a target driving force operating section 100, a mode selecting section 200 (a drive mode change section or means), a target charge/discharge operating section 300, and an operating point commanding section 400.

The target driving force operating section 100 calculates a target driving force tFo0 on the basis of the accelerator opening APO and the vehicle speed VSP using a target driving force map.

The mode selecting section 200 selects the EV drive mode or the HEV drive mode as the target drive mode from the accelerator opening APO and the vehicle speed VSP using the EV-HEV selection map (a map) shown in FIG. 3. However, if the battery SOC is lower than or equal to a predetermined value, the target drive mode is set to the HEV drive mode compulsorily or forcibly. As seen in the EV-HEV selection map, in order to output a great driving force when the vehicle speed VSP is in a low vehicle speed area of a first setting vehicle speed VSP1 or less and the accelerator opening APO is large, the WSC drive mode is set in the EV-HEV selection map. A HEV→WSC change line and an EV→WSC change line are set in a lower vehicle speed area than the first setting vehicle speed VSP1 of an idle rotation speed area of the engine Eng when the automatic transmission AT is set to a first speed. In the EV-HEV selection map, a hatch pattern area (oblique line pattern area) is an area where the mode is changed from the HEV drive mode to the WSC drive mode. A double hatch pattern area (cross line pattern area) is an area where the mode is changed from WSC drive mode to the EV drive mode.

The target charge/discharge operating section 300 calculates a target charge/discharge power tP from the battery SOC using a target charge/discharge amount map shown in FIG. 4.

The operating point commanding section 400 calculates the target engine torque, the target MG torque, the target MG revolution speed, the target CL1 torque and the target CL2 torque, as an operating point attainment target, on the basis of input information such as the accelerator opening APO, the target driving force tFo0, the target drive mode, the vehicle speed VSP and the target charge/discharge power tP. Then the operating point commanding section 400 outputs the target engine torque command, the target MG torque command and the target MG revolution speed command, the target CL1 torque command, the target CL2 torque command to the controllers 1, 2, 5 and 7 respectively through the CAN communication line 11.

Figure 5:
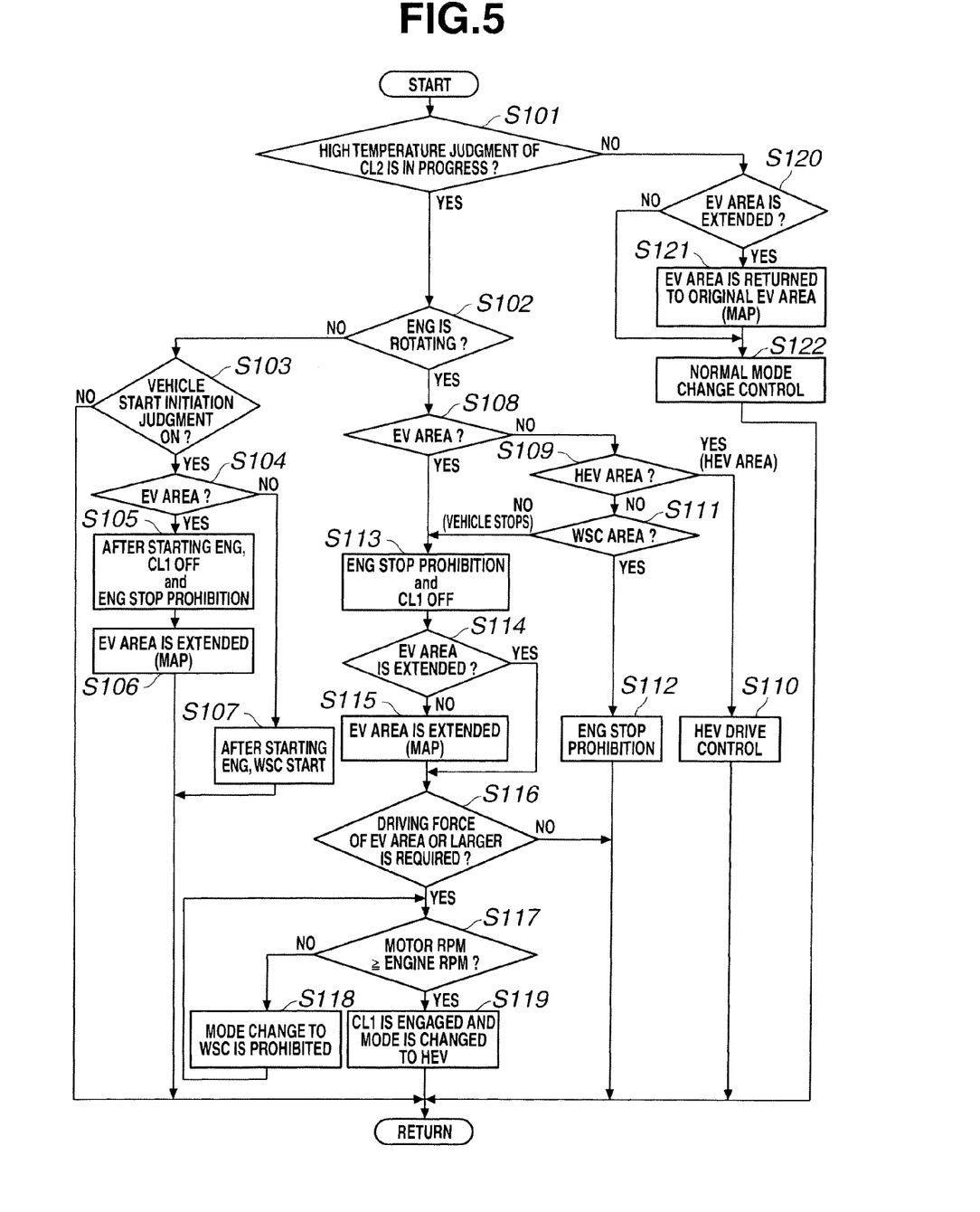
FIG. 5 is a flow chart showing a flow of a second clutch protection control operation executed in the integrated controller 10 of the embodiment 1.
Figure 6:
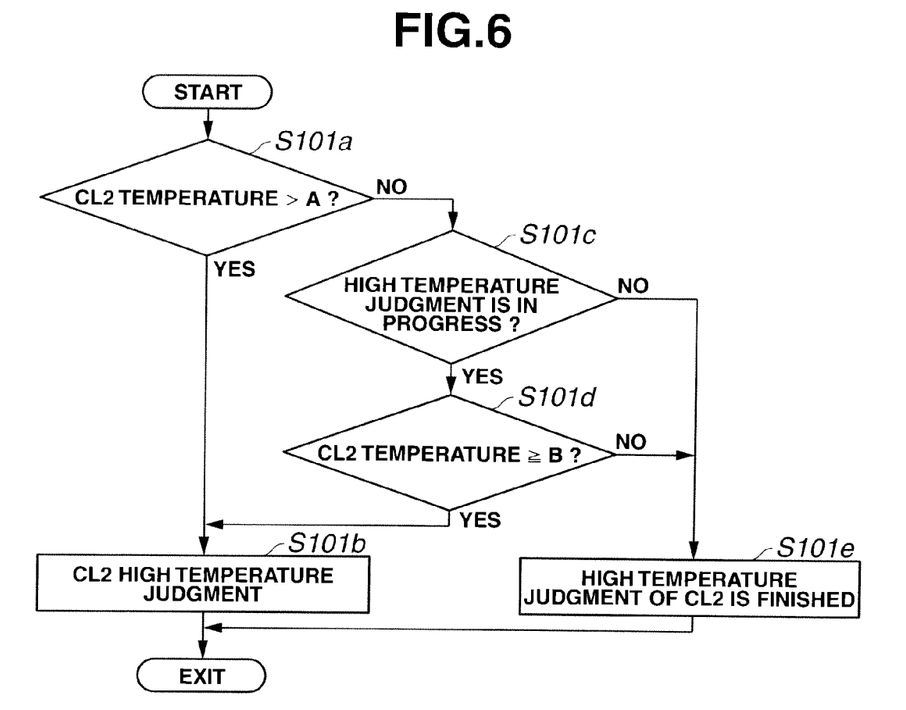
FIG. 6 is a flow chart showing a high temperature judgment operation in the second clutch protection control of the embodiment 1.
Figure 7:
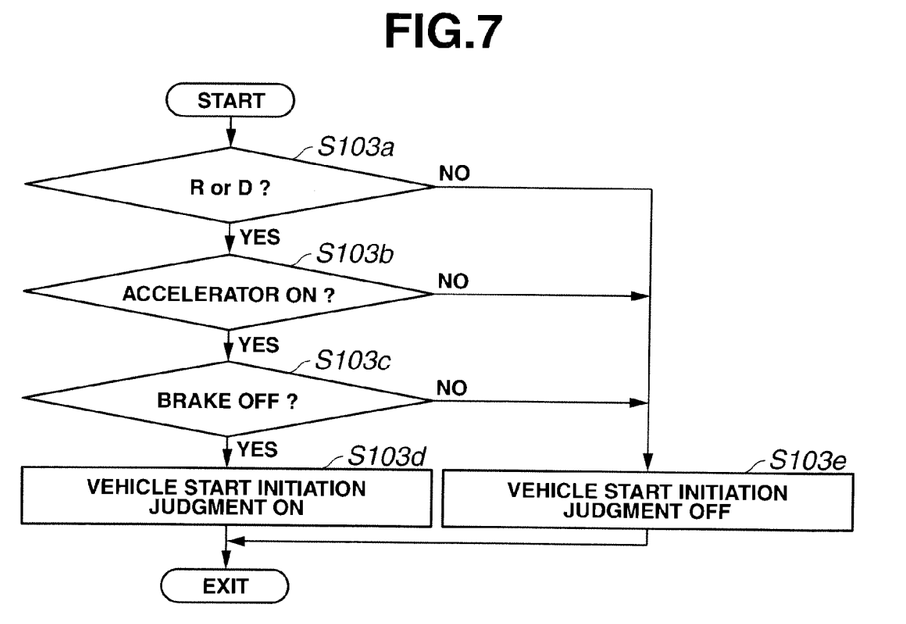
FIG. 7 is a flow chart showing a vehicle start initiation judgment operation in the second clutch protection control of the embodiment 1.

FIG. 5 is a flow chart showing a flow of a second clutch protection control operation executed in the integrated controller 10 of the embodiment 1 (a second engagement element protection control means or section). FIG. 6 is a flow chart showing a high temperature judgment operation in the second clutch protection control of the embodiment 1. FIG. 7 is a flow chart showing a vehicle start initiation judgment operation in the second clutch protection control of the embodiment 1.

In the following, each step in the flow charts shown in FIGS. 5 to 7 will be explained.

In FIG. 5, at step S101, a judgment is made as to whether or not a high temperature judgment of the second clutch CL2 is in progress (whether or not the temperature of the second clutch CL2 is judged to be high). If YES (the CL2 high temperature judgment is in progress), the routine proceeds to step S102. If NO (the CL2 high temperature judgment is finished), the routine proceeds to step S120.

Here, with regard to the high temperature judgment of the second clutch CL2, it is made by the flow chart shown in FIG. 6. At step S101a, if the facing ambient temperature TCL2 of the second clutch CL2 is judged to be higher than a first setting temperature A, the routine proceeds to step S101b, then the temperature of the second clutch CL2 is judged to be high. And, as long as the high temperature judgment is in progress at step S101c and also the facing ambient temperature TCL2 of the second clutch CL2 is judged to be higher than or equal to a second setting temperature B (B<A) at step S101d, the routine proceeds to step S101b and the temperature of the second clutch CL2 is judged to be high. On the other hand, if it is judged that the high temperature judgment is not in progress at step S101c (i.e. if NO at step S101c), or although it is judged that the high temperature judgment is in progress at step S101c, if the facing ambient temperature TCL2 of the second clutch CL2 is judged to be lower than the second setting temperature B at step S101d, the routine proceeds to step S101e and the high temperature judgment of the second clutch CL2 is finished. That is to say, until the facing ambient temperature TCL2 of the second clutch CL2 becomes lower than the second setting temperature B due to temperature decrease after the facing ambient temperature TCL2 exceeds the first setting temperature A due to temperature increase, it is judged that the high temperature judgment is in progress.

At step S102 in FIG. 5, after judging that the CL2 high temperature judgment is in progress (the temperature of the second clutch CL2 is high) at step S101, a judgment is made as to whether or not the engine Eng is rotating. If YES (the engine Eng is rotating), the routine proceeds to step S108. If NO (the engine Eng is in a halt state), the routine proceeds to step S103.

At step S103, after judging that the engine Eng is in the halt state at step S102, a judgment is made as to whether or not a vehicle start initiation judgment is ON. If YES (the vehicle start initiation judgment is ON), the routine proceeds to step S104. If NO (the vehicle start initiation judgment is OFF), the routine proceeds to RETURN.

Here, with respect to the vehicle start initiation judgment, it is made by the flow chart shown in FIG. 7. If all the following conditions; a selected range position is a reverse position (R) or a drive position (D) (at step S103a), the accelerator is ON (at step S103b), the brake is OFF (at step S103c), are satisfied (i.e. all YES at steps S103a to S103c), the routine proceeds to step S103d, and the vehicle start initiation judgment ON is judged. On the other hand, if any one of the above conditions; the selected range position is the reverse position (R) or the drive position (D) (at step S103a), the accelerator is ON (at step S103b), the brake is OFF (at step S103c), is not satisfied, the routine proceeds to step S103e, and the vehicle start initiation judgment OFF is judged.

At step S104 in FIG. 5, subsequent to the judgment of the vehicle start initiation judgment ON at step S103, a judgment is made as to whether or not a current vehicle operating point is present in an EV area on the EV-HEV selection map shown in FIG. 3. If YES (the operating point is in the EV area), the routine proceeds to step S105. If NO (the operating point is present outside the EV area), the routine proceeds to step S107.

At step S105, after judging that the operating point is present in the EV area at step S104, after the engine Eng is started by slip-engaging the first clutch CL1 and cranking up the engine Eng, the first clutch CL1 is disengaged and an engine stop prohibition flag is set, then the routine proceeds to step S106.

At step S106, subsequent to the CL1 OFF after starting the engine Eng and the engine stop prohibition at step S105, a correction that extends the EV area on the EV-HEV selection map shown in FIG. 3 is made (see FIG. 8), and the routine proceeds to RETURN (a map correction section). Here, with regard to the expansion correction of the EV area on the EV-HEV selection map, it is carried out with a size or area which is equivalent to an output of the motor/generator MG required for the engine start being a maximum.

At step S107, after judging that the operating point is present outside the EV area at step S104, after the engine Eng is started by slip-engaging the first clutch CL1 and cranking up the engine Eng, the first clutch CL1 is engaged and the vehicle starts by the WSC drive mode with the second clutch CL2 slip-engaged, then the routine proceeds to RETURN.

At step S108, after judging that the engine Eng is rotating at step S102, a judgment is made as to whether or not the current vehicle operating point is present in the EV area on the EV-HEV selection map shown in FIG. 3 or the corrected EV-HEV selection map. If YES (the operating point is in the EV area), the routine proceeds to step S113. If NO (the operating point is present outside the EV area), the routine proceeds to step S109.

At step S109, after judging that the operating point is present outside the EV area at step S108, a judgment is made as to whether or not the current vehicle operating point is present in a HEV area on the EV-HEV selection map shown in FIG. 3 or the corrected EV-HEV selection map. If YES (the operating point is present in the HEV area), the routine proceeds to step S110. If NO (the operating point is present outside the HEV area), the routine proceeds to step S111.

At step S110, after judging that the operating point is present in the HEV area at step S109, the drive control in the HEV drive mode is executed, and the routine proceeds to RETURN.

At step S111, after judging that the operating point is present outside the HEV area at step S109, a judgment is made as to whether or not the current vehicle operating point is present in a WSC area on the EV-HEV selection map shown in FIG. 3 or the corrected EV-HEV selection map. If YES (the operating point is present in the WSC area), the routine proceeds to step S112. If NO (the operating point is present outside the WSC area: the vehicle stops), the routine proceeds to step S113.

At step S112, after judging that the operating point is present in the WSC area at step S111, the engine stop prohibition flag is set, and the routine proceeds to RETURN.

At step S113, after judging that the operating point is present in the EV area at step S108, or after judging that the operating point is present outside the WSC area, i.e. the vehicle stops at step S111, the engine stop prohibition flag is set and also the first clutch CL1 is disengaged, then the routine proceeds to step S114. Here, in a case where the engine stop prohibition flag is already set and also the first clutch CL1 is already disengaged, this state is maintained.

At step S114, subsequent to the engine stop prohibition and the CL1 OFF at step S113, a judgment is made as to whether or not the EV area on the EV-HEV selection map shown in FIG. 3 is extended. If YES (the EV area expansion correction is made), the routine proceeds to step S116. If NO (there is no EV area expansion correction), the routine proceeds to step S115.

At step S115, after judging that there is no EV area expansion correction at step S114, the correction that extends the EV area on the EV-HEV selection map shown in FIG. 3 is made (see FIG. 8), and the routine proceeds to step S116 (a map correction section). Here, with regard to the expansion correction of the EV area on the EV-HEV selection map, it is carried out with a size or area which is equivalent to an output of the motor/generator MG for the engine start being a maximum.

At step S116, after judging that the EV area expansion correction is made at step S114, or subsequent to the EV area expansion correction at step S115, a judgment is made as to whether or not a driving force of the EV area or larger (i.e. a driving force that is greater than or equal to a usable driving force in the EV area) on the corrected EV-HEV selection map is required. If YES (there is a demand for the driving force of the EV area or larger), the routine proceeds to step S117. If NO (there is no demand for the driving force of the EV area or larger), the routine proceeds to RETURN.

At step S117, after judging that the demand for the driving force of the EV area or larger rises at step S116, or subsequent to prohibition of change (or prohibition of shift) to the WSC drive mode at step S118, a judgment is made as to whether or not the motor revolution speed is greater (higher) than or equal to the engine revolution speed. If YES (the motor rpm≧the engine rpm), the routine proceeds to step S119. If NO (the motor rpm<the engine rpm), the routine proceeds to step S118.

At step S118, subsequent to the judgment of the motor rpm<the engine rpm at step S117, the mode change (or mode shift) from the EV drive mode to the WSC drive mode is prohibited, and the routine returns to step S117 (a third drive mode change prohibition section).

At step S119, subsequent to the judgment of the motor rpm≧the engine rpm at step S117, the first clutch CL1 is engaged at a timing when the motor revolution speed is identical with (or equal to) the engine revolution speed and no clutch relative rotation occurs, and the mode is changed from the EV drive mode to the HEV drive mode directly, then the routine proceeds to RETURN (a second drive mode change section).

At step S120, after judging that the CL2 high temperature judgment is not in progress at step S101, a judgment is made as to whether or not the expansion correction of the EV area on the EV-HEV selection map shown in FIG. 3 is made. If YES (the EV area expansion correction is made), the routine proceeds to step S121. If NO (there is no EV area expansion correction), the routine proceeds to step S122.

At step S121, after judging that the EV area expansion correction is made at step S120, a reduction correction of the extended EV area (the EV area extended by the expansion correction) is performed, and the EV area is returned to the state of the EV area on the EV-HEV selection map shown in FIG. 3, then the routine proceeds to step S122.

At step S122, after judging that no EV area expansion correction is made at step S120, or subsequent to the process that returns the map to the original state at step S121, the normal mode change control which stops the engine Eng in the EV drive mode in which the first clutch CL1 is disengaged, is executed using the EV-HEV selection map shown in FIG. 3, then the routine proceeds to RETURN.

Next, operation of the present invention will be explained. The operation by the control apparatus of the FR hybrid vehicle of the embodiment 1 will be explained, in order of a mode change control operation when the CL2 high temperature judgment is not in progress, a mode change control operation when the CL2 high temperature judgment is in progress and a second clutch protection control operation.

[Mode Change Control Operation when the CL2 High Temperature Judgment is not in Progress]

In the following, the mode change control operation when the CL2 high temperature judgment is not in progress will be explained using the flow chart in FIG. 5.

In the flow chart in FIG. 5, when the CL2 high temperature judgment is not in progress, the flow of steps S101→S120 (→S121)→S122→RETURN is repeated. And at step S122, the normal mode change control which stops the engine Eng in the EV drive mode in which the first clutch CL1 is disengaged, is executed using the EV-HEV selection map shown in FIG. 3.

In the normal mode change control, since the engine Eng is stopped in the EV drive mode with consideration given to gas mileage performance, the motor/generator MG must save a reserve force of the torque required for the engine start. Because of this, the area of the EV drive mode (the area in which the EV drive mode can be selected) on the EV-HEV selection map (FIG. 3) used in the normal mode change control becomes narrower than an area of the EV drive mode determined by the torque (or driving force) which the primary motor/generator MG is able to output.

Therefore, for instance, in the case of the vehicle start in the EV drive mode, when the driver's required driving force becomes high by the accelerator pedal depression and then the mode change to the HEV drive mode is judged after the judgment of the vehicle start initiation, the vehicle start is the WSC start from the engine start, and the frequency with which the WSC drive mode is selected is increased. Thus, the frequency of the slip-control of the second clutch CL2 also increases.

In particular, since the driver's required driving force is high at the vehicle start, the WSC start from the engine start occurs often, and the frequency of the slip-control of the second clutch CL2 increases. Then, under a condition in which the second clutch CL2 is too hot, when the slip-control by the WSC start from the engine start is further carried out at the next vehicle start, the facing temperature of the second clutch CL2 increases and becomes high.

[Mode Change Control Operation when the C12 High Temperature Judgment is in Progress]

In the following, the mode change control operation in the case of a HEV start when the CL2 high temperature judgment is in progress will be explained using the flow chart in FIG. 5.

As described above, when the facing temperature of the second clutch CL2 increases and becomes high by the execution of the normal mode change control, instead of the normal mode change control, the mode change control that performs the second clutch protection is carried out.

For example, after the travel by the execution of the normal mode change control, when the temperature of the second clutch CL2 is judged to be high in an engine Eng and vehicle halt state, in the flow chart in FIG. 5, the flow of steps S101→S102→S103→RETURN is repeated. Then at step S103, the vehicle start initiation judgment is made.

When the vehicle start initiation judgment ON is judged at step S103 and driver's intention to start the vehicle is confirmed, the routine proceeds from steps S101, S102 and S103 to step S104. Then at step S104, the judgment is made as to whether or not the current vehicle operating point is present in the EV area on the EV-HEV selection map shown in FIG. 3.

At step S104, when it is judged that the operating point is present outside the EV area upon the vehicle start initiation judgment at a selection start from the state of the accelerator pedal depression, the routine proceeds from step S104 to step S107. And at step S107, after starting the engine Eng, the first clutch CL1 is engaged and the vehicle starts by the WSC drive mode in which the second clutch CL2 is slip-engaged.

Further, when the engine Eng is rotating and the operating point is present in the WSC area, the control steps S101→S102→S108→S109→S111→S112 are executed. Then at step S112, the stop of the engine Eng is prohibited. Subsequently, when the operating point shifts to the HEV area, in the flow chart in FIG. 5, the control steps S101→S102→S108→S109→S110 are executed. Then at step S110, the drive control in the HEV drive mode is executed.

That is to say, only in the case of the selection start from the state of the accelerator pedal depression, in preference to the second clutch protection control, in order to meet the driver's demand for the driving force, the mode change control in which the mode is changed from the WSC drive mode to the HEV drive mode at the vehicle start is carried out.

On the other hand, at the EV selection start when it is judged that the operating point is present in the EV area upon the vehicle start initiation judgment, the flow proceeds from step S104 to steps S105 and S106. Then at step S105, after starting the engine Eng by slip-engaging the first clutch CL1 and cranking up the engine Eng, the first clutch CL1 is disengaged and the engine stop prohibition flag is set. And at step S106, the correction that extends the EV area on the EV-HEV selection map shown in FIG. 3 is made.

Subsequently, since the engine Eng is rotating and the operating point is present in the EV area, the control steps S101→S102→S108→S113→S114→S116 are executed. Then when there is no demand for the driving force of the extended EV area (the EV area extended by the expansion correction) or larger at step S116, the flow of steps S101→S102→S108→S113→S114→S116 is repeated. Then, until it is judged that the operating point is not present in the EV area on the correction map at step S108, the engine Eng rotates in an idle rotation speed range, and the EV drive mode in which the first dutch CL1 is disengaged is maintained.

Furthermore, in the case of the EV selection start after the vehicle start initiation judgment or the case of a D range EV start from the vehicle halt (i.e. the case of steps S111→S113), and additionally, in the case where the demand for the driving force of the extended EV area (the EV area extended by the expansion correction) or larger rises at step S116 and also the engine revolution speed is greater (higher) than the motor revolution speed, the control steps S117→S118 from S116 are executed, and the flow of steps S117→S118 is repeated. Then at step S118, the mode change from the EV drive mode to the WSC drive mode is prohibited. Then when the engine revolution speed is lower than or equal to the motor revolution speed, the flow proceeds from step S117 to step S119. And at step S119, the first clutch CL1 is engaged at the timing of the engine rpm=the motor rpm, and the mode skips the WSC drive mode and changes directly from the EV drive mode to the HEV drive mode.

[Second Clutch Protection Control Operation]

In the embodiment 1, the second clutch protection control executed when it is judged that the temperature of the second clutch CL2 is high (when it is judged that the temperature of the second clutch CL2 is a predetermined temperature or higher), features the following points.

(Engine Stop Prohibition Judgment Logic)

Engine stop prohibition judgment logic of the embodiment 1 is logic that does not stop the engine Eng when the facing ambient temperature of the second clutch CL2 is high. More specifically, When the vehicle operating point is in the EV area at the vehicle start initiation judgment, the engine Eng that is in the holt state is started, and after the engine rotates, the first clutch CL1 is disengaged and the stop of the engine Eng is prohibited (step S105).

When the engine Eng is rotating and the vehicle operating point is in the EV area, the first clutch CL1 is disengaged and the stop of the engine Eng is prohibited (step S113).

When the engine Eng is rotating and the vehicle operating point is in the WSC area, the stop of the engine Eng is prohibited (step S112).

Here, the vehicle start initiation judgment is the judgment that detects the vehicle start and the acceleration etc. and as mentioned above, as shown in FIG. 7, the vehicle start initiation judgment is made using the D-range or R-range, the accelerator ON and the brake OFF.

In the EV drive mode, in a case where brake of regenerative brake or greater (brake whose braking force is greater than or equal to that of regenerative brake) is required, in order to apply the brake by engine brake, the first clutch CL1 is engaged.

As described above, in the second clutch protection control (heat protection control of the second clutch CL2), since the engine operating (rotating) state is kept or maintained regardless of the drive mode, the reserve force of the motor torque can be fully used for the driving torque in the EV drive mode in which the vehicle travels by only the driving force of the motor/generator MG. In other words, while meeting the driver's required driving force, the drive area (an area condition) in which the EV drive mode is selected can be extended.

With this expansion of the EV drive mode selection area, the frequency of the mode change from the EV drive mode to the WSC drive mode can be reduced without giving an awkward feeling caused by lack of the driving force to the driver.

(EV Feasible Area Judgment Logic)

Figure 8:
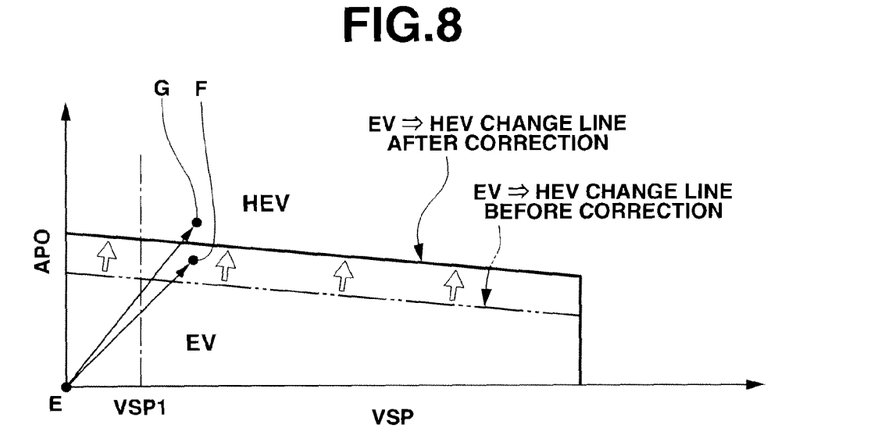
FIG. 8 is a drawing showing mode changes of a case where operating points shift on the EV-HEV selection map when a driving force of an EV area or larger is required at an EV start during the CL2 high temperature judgment.

EV feasible area judgment logic of the embodiment 1 is logic which judges necessity for the engine start reserve force depending on whether the engine Eng is operating (rotating) in the EV drive mode selection state and performs the correction that extends the EV area on the predetermined EV-HEV selection map (steps S106, S115). That is, as shown in FIG. 8, an EV→HEV change line on the EV-HEV selection map before the correction determines or defines the EV drive mode area according to the battery SOC and the motor revolution speed (output characteristic) etc. On the other hand, an EV→HEV change line on the EV-HEV selection map after the correction extends the EV drive mode area toward the HEV drive mode area with a size or area which is equivalent to the engine start reserve force being a maximum.

For example, in FIG. 8, a case where the vehicle operating point changes from an operating point E to an operating point F at the EV start, will be explained. Here, the mode change control using the EV-HEV selection map before the correction (i.e. using non-corrected EV-HEV selection map) is an comparative example, and the mode change control using the EV-HEV selection map after the correction (i.e. using the corrected EV-HEV selection map) is an embodiment 1-1.

Figure 9A:
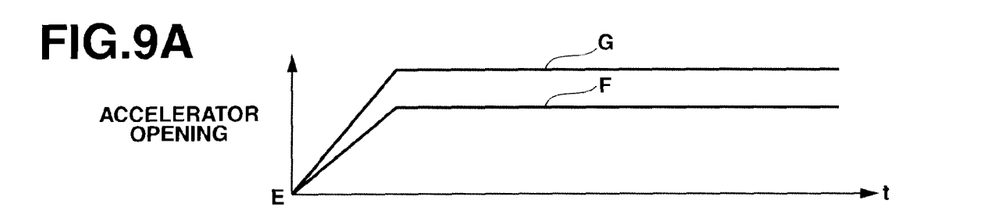
FIGS. 9A~9E are time charts showing each characteristic of accelerator opening, revolution speed (engine revolution or rotation speed, motor revolution or rotation speed), mode change of a comparative example, mode change of an embodiment 1-1 and mode change of an embodiment 1-2, when the driving force of the EV area or larger is required at the EV start during the CL2 high temperature judgment.
Figure 9B:
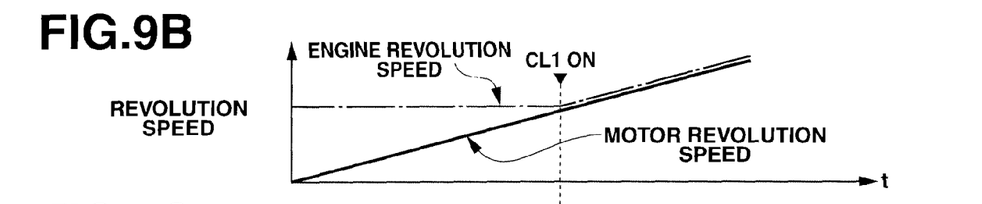
Figure 9C:
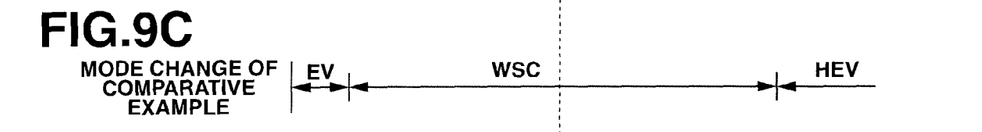

In the case of the comparative example, as can be seen in FIG. 8, since the operating point F is present in the HEV drive mode area and the mode is judged to be the HEV drive mode, as shown in a mode change characteristic of the comparative example in FIG. 9C, the mode change of the EV drive mode→the WSC drive mode→the HEV drive mode is carried out.

Figure 9D:
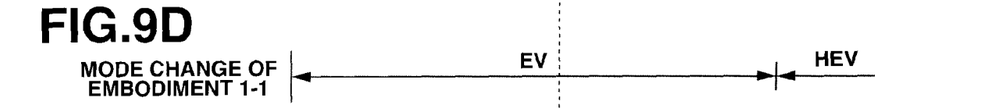

On the other hand, in the case of the embodiment 1-1, as can be seen in FIG. 8, since the operating point F is present in the extended EV drive mode area without rapid accelerator pedal depression, as shown in a mode change characteristic of the embodiment 1-1 in FIG. 9D, the vehicle start is the EV start, and subsequently, the mode shifts from the EV drive mode to the HEV drive mode.

Hence, in a simple manner that only corrects the existing EV-HEV selection map, while meeting the driver's required driving force, it is possible to surely reduce the frequency of the shift to the WSC drive mode which could cause the overheating of the second clutch CL2.

(Control Logic that Maintains the EV Drive Mode at the Accelerator Depression Start)

Control logic that maintains the EV drive mode at the accelerator depression start of the embodiment 1 is logic that maintains the EV drive mode in a certain range or area when the accelerator pedal is depressed at the EV start, even if the driver's required driving force cannot be attained.

That is, in the embodiment 1, even if the mode change from the EV drive mode to the WSC drive mode on the corrected EV-HEV selection map is judged at the vehicle start from the vehicle halt state (YES at step S116), the mode change from the EV drive mode to the WSC drive mode is prohibited until the motor revolution speed is greater (higher) than or equal to the engine revolution speed (step S117→step S118). Then when the motor revolution speed is greater than or equal to the engine revolution speed, the first clutch CL1 is engaged and the mode is changed to the HEV drive mode (step S117→step S119).

For example, in FIG. 8, a case where the vehicle operating point changes from the operating point E to an operating point G at the EV start, will be explained. Here, the mode change control using the EV-HEV selection map before the correction (i.e. using non-corrected EV-HEV selection map) is the comparative example. The mode change control using the EV-HEV selection map after the correction (i.e. using the corrected EV-HEV selection map) and also using the control logic maintaining the EV drive mode, is an embodiment 1-2.

In the case of the comparative example, as shown in the mode change characteristic of the comparative example in FIG. 9C, the vehicle start is the WSC start.

Figure 9E:
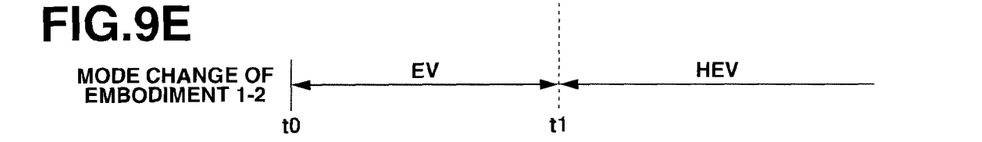

On the other hand, in the case of the embodiment 1-2, as can be seen in FIG. 8, since the operating point G is present in the HEV drive mode area and the mode is judged to be the HEV drive mode. However, as shown in a revolution speed characteristic in FIG. 9B, since the mode change to the WSC drive mode is prohibited until the motor revolution speed reaches the engine revolution speed, as shown in a mode change characteristic of the embodiment 1-2, the EV drive mode is maintained from time t0 to time t1. Then by the engagement of the first clutch CL1 at the time t1, the mode is changed to the HEV drive mode from the time t1, which skips the WSC drive mode.

Hence, by prohibiting the mode change to the WSC drive mode, the heat protection of the second clutch CL2 is further achieved. In addition, by engaging the first clutch CL1 at the timing when the motor revolution speed is identical with the engine revolution speed, a mode change shock is suppressed, and the mode change from the EV drive mode to the HEV drive mode, which skips the WSC drive mode, can be achieved.

Next, effects of the present invention will be explained. The control apparatus of the FR hybrid vehicle in the embodiment 1 provides the following effects.

(1) The control apparatus of the hybrid vehicle, the hybrid vehicle having the engine (Eng), the motor (motor/generator MG), the first engagement element (first clutch CL1) arranged between the engine (Eng) and the motor (MG) for connecting/disconnecting the engine (Eng) and the motor (MG) and the second engagement element (second clutch CL2) arranged between the motor (MG) and driving wheels (RL, RR) for connecting/disconnecting the motor (MG) and the driving wheels (RL, RR), the control apparatus comprises: the drive mode change section (mode selecting section 200) that changes the following drive modes according to the vehicle travel state: the first drive mode (EV drive mode) in which the first engagement element (CL1) is disengaged and the second engagement element (CL2) is engaged then the vehicle travels by only the driving force of the motor (MG), the second drive mode (HEV drive mode) in which the first and second engagement elements (CL1, CL2) are respectively engaged then the vehicle travels by both driving forces of the engine (Eng) and the motor (MG), and the third drive mode (WSC drive mode) in which the second engagement element (CL2) is slip-engaged then the vehicle travels by a driving force transmitted through the second engagement element (CL2); the temperature detection section (second clutch temperature sensor 18) that detects the temperature of the second engagement element (CL2); and the second engagement element protection control section (FIG. 5) that keeps the engine rotating state regardless of the drive mode when the temperature of the second engagement element (CL2) is the predetermined temperature or higher. With this, the frequency of the mode change to the third drive mode (the WSC drive mode), which causes the overhearing of the second engagement element (the second clutch CL2), can be reduced at the vehicle start, then the durability and reliability of the second engagement element can be ensured. In addition, it is possible to reduce the frequency of slip of the second engagement element at the engine start during the travel.

(2) Upon the execution of the protection control keeping the engine rotating state, the second engagement element protection control section (FIG. 5) extends an area condition in which the first drive mode (EV drive mode) is selected as compared with no execution of the protection control.

With this expansion, the frequency of the shift to the third drive mode (the WSC drive mode) in which the temperature of the second engagement element (the second clutch CL2) could become too high can be reduced.

(3) The drive mode change section (mode selecting section 200) has the map (EV-HEV selection map) by which the drive mode is determined on the basis of at least the accelerator opening (APO), and the second engagement element protection control section (FIG. 5) has the map correction section (steps S106, S115) which makes the correction that extends the area of the first drive mode (EV drive mode) on the map (EV-HEV selection map), with the area which is equivalent to the output of the motor (MG) required for the engine start being the maximum, upon the execution of the protection control keeping the engine rotating state.

In the simple manner that only corrects the existing map (EV-HEV selection map), while meeting the driver's required driving force, it is possible to surely reduce the frequency of the shift to the third drive mode (the WSC drive mode) which could cause the overheating of the second engagement element (the second clutch CL2).

(4) The second engagement element protection control section (FIG. 5) further has the third drive mode change prohibition section (steps S117→S118) that prohibits the mode change to the third drive mode (WSC drive mode) until the motor revolution speed is greater than or equal to the engine revolution speed, even if the mode change from the first drive mode (EV drive mode) to the third drive mode (WSC drive mode) on the corrected map (EV-HEV selection map) is judged at the vehicle start from the vehicle halt state; and the second drive mode change section (steps S117→S119) that changes the drive mode to the second drive mode (HEV drive mode) with the first engagement element (CL1) engaged when the motor revolution speed is greater than or equal to the engine revolution speed.

By the prohibition of the shift to the third drive mode (the WSC drive mode), the heat protection of the second engagement element (the second clutch CL2) is further achieved. In addition, the mode change from the first drive mode (the EV drive mode) to the second drive mode (the HEV drive mode) can be achieved while suppressing the mode change shock.

[Embodiment 2]

An embodiment 2 is the one that employs control logic that maintains the EV drive mode in a case where a rate of change (or speed of change) of the required driving force is low (slow) at the accelerator depression start.

Figure 10:
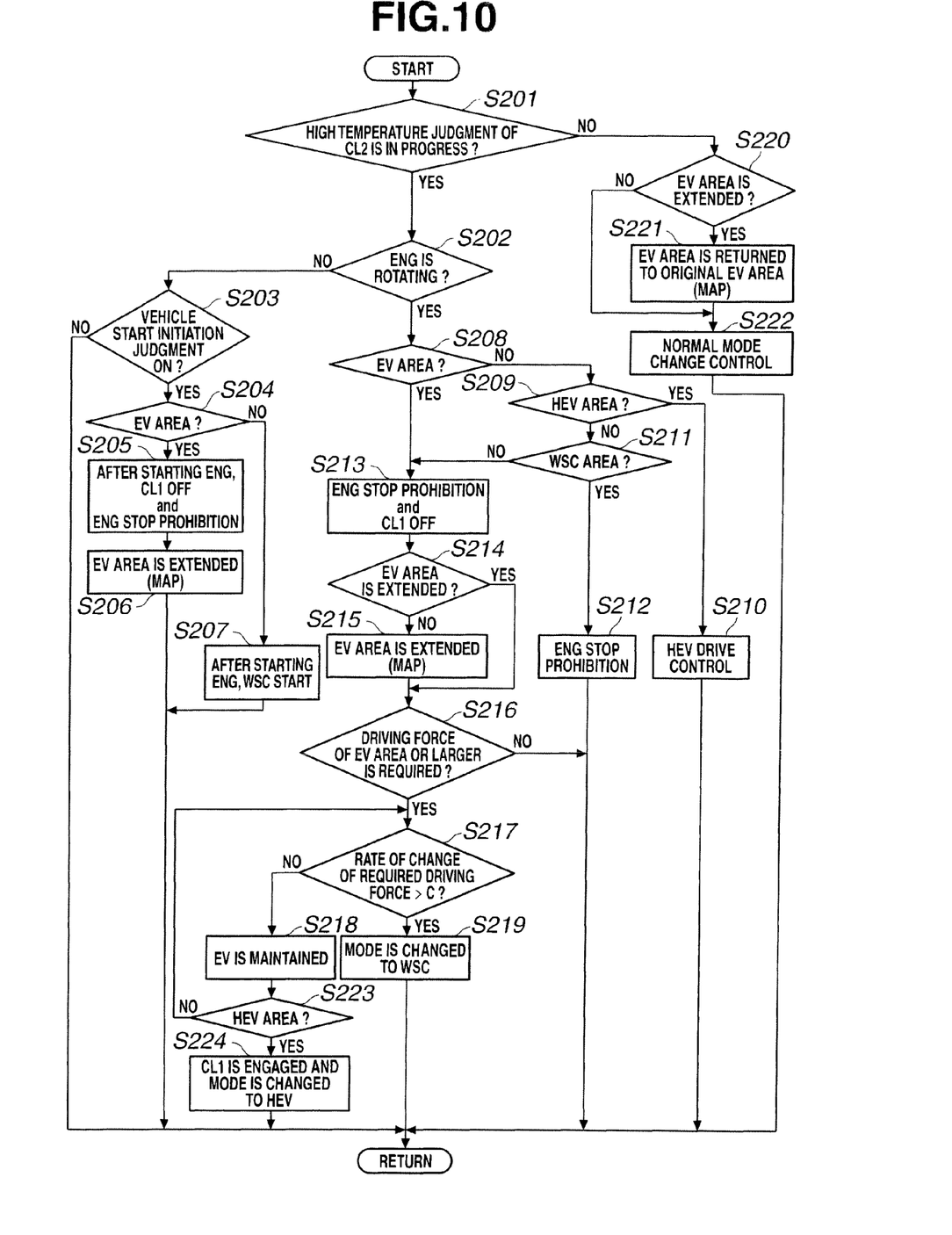
FIG. 10 is a flow chart showing a flow of a second clutch protection control operation executed in the integrated controller 10 of an embodiment 2.

FIG. 10 is a flow chart showing a flow of a second clutch protection control operation executed in the integrated controller 10 of the embodiment 2 (a second engagement element protection control means).

In the following, each step in the flow chart in FIG. 10 will be explained. In the flow chart, with respect to steps S201~S216 and S220~S222, the same operations as steps S101~S116 and S120~S122 in FIG. 5 are executed. Thus, these explanations will be omitted here.

At step S217 in FIG. 10, after judging that the demand for the driving force of the EV area or larger rises at step S216, or subsequent to the maintenance of the EV drive mode at step S218, a judgment is made as to whether or not a rate of change (or speed of change) of the required driving force (e.g. the accelerator opening APO, the target driving force etc.) exceeds a setting change rate (or change speed) C. If YES (the change rate of the required driving force>C), the routine proceeds to step S219. If NO (the change rate of the required driving force≦C), the routine proceeds to step S218.

At step S218, subsequent to the judgment of the change rate of the required driving force $\leq C$ at step S217, the EV drive mode is maintained as it is, regardless of the demand for the driving force of the EV area or larger, and the routine proceeds to step S223 (a first drive mode maintenance section).

At step S223, subsequent to the maintenance of the EV drive mode at step S218, a judgment is made as to whether or not the operating point is present in the HEV area on the extended map. If YES (the operating point is in the HEV area), the routine proceeds to step S224. If NO, the routine returns to step S217.

At step S224, after judging that the operating point is present in the HEV area on the extended map at step S223, the first clutch CL1 is engaged and the mode is changed to the HEV drive mode, then the routine proceeds to RETURN.

At step S219, subsequent to the judgment of the change rate of the required driving force>C at step S217, the mode is changed to the WSC drive mode in which the second clutch CL2 is slip-engaged and the revolution speed control of the motor/generator MG is performed then the first clutch CL1 is engaged at the timing when the motor revolution speed is identical with the engine revolution speed and no clutch relative rotation occurs, then the routine proceeds to RETURN. System and operation process etc. of the embodiment 2 are the same as those shown in FIGS. 1~4, 6 and 7, of the embodiment 1. Thus, these drawings and explanations are omitted here.

Next, operation of the embodiment 2 will be explained.
(Control Logic that Maintains the EV Drive Mode at the Accelerator Depression Start)
Control logic that maintains the EV drive mode at the accelerator depression start of the embodiment 2 is logic that maintains the EV drive mode in a certain range or area when the accelerator pedal is depressed at the EV start, even if the driver's required driving force cannot be attained.

That is, in the embodiment 2, when the mode change from the EV drive mode to the WSC drive mode on the corrected EV-HEV selection map is judged at the vehicle start from the vehicle halt state (YES at step S216), in the case where the change rate of the required driving force exceeds the setting change rate C, namely in the case where the required driving force is great, the mode change from the EV drive mode to the WSC drive mode is carried out in accordance with the normal mode change manner (steps S217→S219). However, in the case where the change rate of the required driving force is less than or equal to the setting change rate C, namely in the case where the required driving force is small, the EV drive mode is maintained as it is, regardless of the demand for the driving force of the EV area or larger (steps S217→S218).

Figure 11:
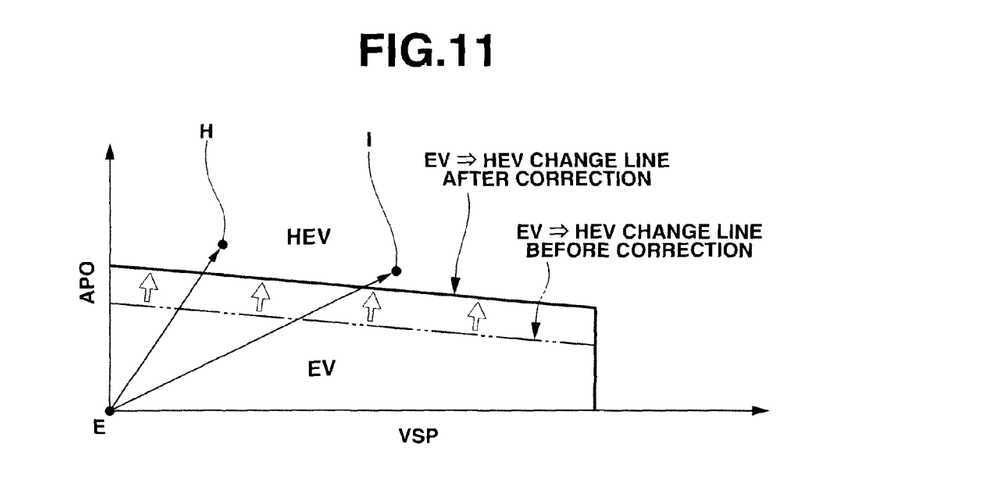
FIG. 11 is a drawing showing mode changes of a case where operating points that have different rates of change shift on the EV-HEV selection map when the driving force of the EV area or larger is required at the EV start during the CL2 high temperature judgment.
Figure 12A:
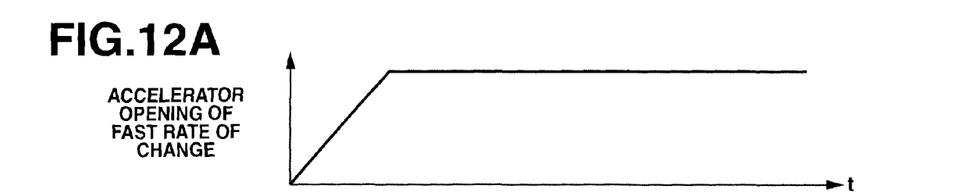
FIGS. 12A~12D are time charts showing each characteristic of accelerator opening of fast rate of change, mode change of [rate of change>C], accelerator opening of slow rate of change and mode change of [rate of change≦C], when the driving force of the EV area or larger is required at the EV start during the CL2 high temperature judgment.
Figure 12B:
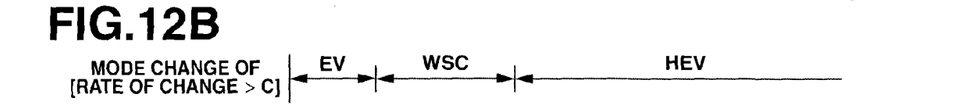

For example, in FIG. 11, a case where the vehicle operating point changes from the operating point E to an operating point H at the EV start, will be explained. As shown in an accelerator opening characteristic of a fast rate of change in FIG. 12A, in the case where the change rate of the required driving force exceeds the setting change rate C, as can be seen in a mode change characteristic of the change rate>C in FIG. 12B, the mode change of the EV drive mode→the WSC drive mode→the HEV drive mode is carried out.

Figure 12C:
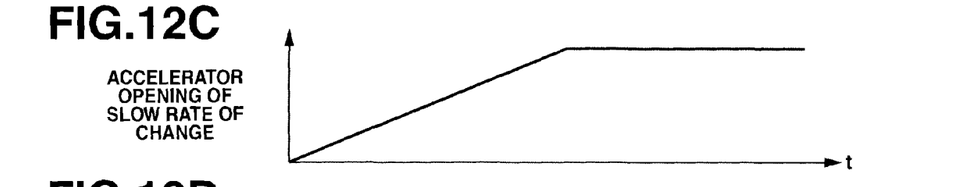
Figure 12D:
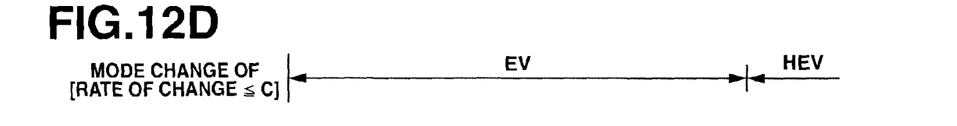

On the other hand, a case where the vehicle operating point changes from the operating point E to an operating point I at the EV start, will be explained. As shown in an accelerator opening characteristic of a low (or slow) rate of change in FIG. 12C, in the case where the change rate of the required driving force is less than or equal to the setting change rate C, as can be seen in a mode change characteristic of the change rate$\leq C$ in FIG. 12D, regardless of the judgment of the mode change to the HEV drive mode, the EV drive mode is maintained. Then when it is judged that the operating point shifts in the HEV area, the mode is changed to the HEV drive mode.

Accordingly, by maintaining the EV drive mode when the change rate of the required driving force is the setting change rate C or less while meeting the driver's demand for the large driving force when the change rate of the required driving force exceeds the setting change rate C, the heat protection of the second clutch CL2 is further achieved. That is to say, when the change rate of the required driving force is the setting change rate C or less, the driver's demand for the driving force is estimated to be low. Thus, even if the EV drive mode is maintained, the awkward feeling given to the driver can be minimized, and it is possible to prohibit the mode change to the WSC drive mode, which is effective in the heat protection of the second clutch CL2.

Other operations of the embodiment 2 are the same as the embodiment 1, thus their explanations are omitted here.

Next, effect of the embodiment 2 will be explained. The control apparatus of the FR hybrid vehicle in the embodiment 2 provides the following effect, in addition to the effects (1)~(4) of the embodiment 1.

(5) The second engagement element protection control section (FIG. 10) further has the first drive mode maintenance section (step S218) that maintains the first drive mode (EV drive mode) as it is, when the rate of change of the required driving force is less than or equal to the setting change rate (C) (NO at step S217), even if the mode change from the first drive mode (EV drive mode) to the third drive mode (WSC drive mode) on the corrected map (EV-HEV selection map) is judged (YES at step S216) at the vehicle start from the vehicle halt state.

With this, when the change rate of the required driving force is the predetermined value (the setting change rate C) or less, by maintaining the EV drive mode on the basis of the estimation of the low driver's demand for the driving force, the further heat protection of the second clutch CL2 can be achieved while minimizing the awkward feeling given to the driver.

Although the control apparatus of the hybrid vehicle according to the present invention has been explained on the basis of the embodiments 1 and 2, the present invention is not limited to the embodiments 1 and 2.

In the embodiments 1 and 2, by using the second clutch temperature sensor 18 that is a thermometer for directly measuring the ambient temperature of the facing of the second clutch CL2, until the facing ambient temperature TCL2 of the second clutch CL2 becomes lower than the second setting temperature B due to temperature decrease after the facing ambient temperature TCL2 exceeds the first setting temperature A due to temperature increase, it is judged that the high temperature judgment is in progress. However, instead of the second dutch temperature sensor 18, it could be possible to use a second clutch temperature estimation means which measures or checks heat value of the second clutch CL2 (that is estimated from the transmission torque and slip-revolution speed difference etc.) and heat release of the second clutch CL2 (that is estimated from engagement time, disengagement time and an atmospheric temperature etc.) then estimates the facing ambient temperature of the second clutch CL2.

In the embodiment 1, the control which prohibits the mode change to the WSC drive mode and maintains the EV drive mode at the accelerator depression start then changes the mode from the EV drive mode to the HEV drive mode, is explained. In the embodiment 2, the control logic that maintains the EV drive mode in the case where the change rate of the required driving force is low (slow) at the accelerator depression start, is employed. However, each control logic of the embodiments 1 and 2 which maintains the EV drive mode, could be combined as a parallel control logic. Further, control logic that maintains the EV drive mode, which is executed under other conditions, might be employed.

In the embodiments 1 and 2, the control apparatus is applied for the FR hybrid vehicle. However, the control apparatus can also be applied for the FF hybrid vehicle. That is, as long as the hybrid vehicle has the engine, the first engagement element, the motor, the second engagement element and the driving wheels on the driveline from an upstream side, the control apparatus can be applied for such vehicle.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A control apparatus of a hybrid vehicle, the hybrid vehicle having an engine, a motor, a first engagement element arranged between the engine and the motor for connecting/disconnecting the engine and the motor and a second engagement element arranged between the motor and driving wheels for connecting/disconnecting the motor and the driving wheels, the control apparatus comprising:
    a drive mode change section that changes the following drive modes according to a vehicle travel state:
        a first drive mode in which the first engagement element is disengaged and the second engagement element is engaged when the vehicle travels by only a driving force of the motor,
        a second drive mode in which the first and second engagement elements are respectively engaged when the vehicle travels by both driving forces of the engine and the motor, and
        a third drive mode in which the second engagement element is slip-engaged when the vehicle travels by a driving force transmitted through the second engagement element;
    a temperature detection section that detects a temperature of the second engagement element; and
    a second engagement element protection control section that keeps an engine rotating state regardless of the drive mode when the temperature of the second engagement element is a predetermined temperature or higher,
    wherein upon the execution of protection control keeping the engine rotating state, the second engagement element protection control section extends an area condition in which the first drive mode is selected as compared with no execution of protection control.

2. The control apparatus of the hybrid vehicle as claimed in claim 1 wherein:
    if the temperature of the second engagement element is the predetermined temperature or higher, when the engine is in a halt state, the second engagement element protection control section starts the engine and keeps the engine rotating state.

3. The control apparatus of the hybrid vehicle as claimed in claim 1, wherein:
    the drive mode change section has a map by which the drive mode is determined based on at least an accelerator opening, and
    the second engagement element protection control section has a map correction section which makes a correction that extends an area of the first drive mode on the map, with an area which is equivalent to an output of the motor required for an engine start being a maximum, upon execution of protection control keeping the engine rotating state.

4. The control apparatus of the hybrid vehicle as claimed in claim 3, wherein:
    the second engagement element protection control section further has
        a third drive mode change prohibition section that prohibits a mode change to the third drive mode until a motor revolution speed is greater than or equal to an engine revolution speed, even if a mode change from the first drive mode to the third drive mode on the corrected map is judged at a vehicle start from a vehicle halt state; and
        a second drive mode change section that changes the drive mode to the second drive mode with the first engagement element engaged when the motor revolution speed is greater than or equal to the engine revolution speed.

5. The control apparatus of the hybrid vehicle as claimed in claim 3, wherein:
    the second engagement element protection control section comprises a first drive mode maintenance section that maintains the first drive mode, when a rate of change of a required driving force is less than or equal to a setting change rate, even if a mode change from the first drive mode to the third drive mode on the corrected map is judged at a vehicle start from a vehicle halt state.

6. A method for controlling a hybrid vehicle, the hybrid vehicle provided with a first engagement element arranged between an engine and a motor for connecting/disconnecting the engine and the motor and a second engagement element arranged between the motor and driving wheels for connecting/disconnecting the motor and driving wheels, and having the following drive modes:
    a first drive mode in which the first engagement element is disengaged and the second engagement element is engaged when the vehicle travels by only a driving force of the motor,
    a second drive mode in which the first and second engagement elements are respectively engaged when the vehicle travels by both driving forces of the engine and the motor, and
    a third drive mode in which the second engagement element is slip-engaged when the vehicle travels by a driving force transmitted through the second engagement element,
    the method comprising:
        changing the drive mode according to a vehicle travel state;
        detecting a temperature of the second engagement element, and
        keeping an engine rotating state regardless of the drive mode when the temperature of the second engagement element is a predetermined temperature or higher, and
        when keeping the engine rotating state, extending an area condition in which the first drive mode is selected as compared with no execution of the protection control.

7. The method for controlling the hybrid vehicle as claimed in claim 6, further comprising:
    prohibiting a mode change to the third drive mode until a motor revolution speed is greater than or equal to an engine revolution speed, even if a mode change from the first drive mode to the third drive mode under the extended area condition is judged at a vehicle start from a vehicle halt state, and changing the drive mode to the second drive mode with the first engagement element engaged when the motor revolution speed is greater than or equal to the engine revolution speed.

8. The method for controlling the hybrid vehicle as claimed in claim 6, further comprising:

maintaining the first drive mode, when a rate of change of a required driving force is less than or equal to a setting change rate, even if a mode change from the first drive mode to the third drive mode under the extended area condition is judged at a vehicle start from a vehicle halt state.

* * * * *